United States Patent
Mindte

(10) Patent No.: US 10,560,433 B2
(45) Date of Patent: Feb. 11, 2020

(54) VERTICAL CLOUD SERVICE

(71) Applicant: MINTSOFT, LLC, Laguna Beach, CA (US)

(72) Inventor: Jason Mindte, Laguna Beach, CA (US)

(73) Assignee: MINTSOFT, LLC., Laguna Beach, CA (US)

( * ) Notice: Subject to any disclaimer, the term of this patent is extended or adjusted under 35 U.S.C. 154(b) by 128 days.

(21) Appl. No.: 15/680,122

(22) Filed: Aug. 17, 2017

(65) Prior Publication Data

US 2018/0054420 A1    Feb. 22, 2018

Related U.S. Application Data

(60) Provisional application No. 62/376,317, filed on Aug. 17, 2016.

(51) Int. Cl.
| | |
|---|---|
| *H04L 12/46* | (2006.01) |
| *H04L 29/06* | (2006.01) |
| *H04L 29/08* | (2006.01) |
| *G06F 9/455* | (2018.01) |

(52) U.S. Cl.
CPC ...... *H04L 63/0272* (2013.01); *G06F 9/45558* (2013.01); *H04L 12/4641* (2013.01); *H04L 67/06* (2013.01); *G06F 2009/45587* (2013.01); *G06F 2009/45595* (2013.01)

(58) Field of Classification Search
CPC .................................................. H04L 63/0272
See application file for complete search history.

(56) References Cited

U.S. PATENT DOCUMENTS

| | | | | |
|---|---|---|---|---|
| 2006/0041761 | A1* | 2/2006 | Neumann ............... | G06F 21/32 713/189 |
| 2006/0282889 | A1* | 12/2006 | Brown ................ | H04L 63/0272 726/15 |

* cited by examiner

*Primary Examiner* — Josnel Jeudy
(74) *Attorney, Agent, or Firm* — Fish IP Law, LLP

(57) ABSTRACT

A system for securely provided content to a user hides the identity of the user and/or the content from an outside observer by utilizing a plurality of virtual private networks (VPNs) and virtual machines (VMs) to obfuscate transmission sources. A key is used to generate and control access to a first VPN between a user device and a server that has access to the content. Once the first VPN is generated, user device and server could communicate securely to generate unique VMs having distinct identifiers from the user device and the server, and a second VPN could be generated between the two newly generated VMs. Once content has been provided to the user device via its VM, the content session could end and all the secure infrastructure could be deconstructed.

20 Claims, 5 Drawing Sheets

VERTICAL CLOUD SERVICE

FIELD OF THE INVENTION

The field of the invention is cloud services.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The Internet provides broad access to a wide range of information, ideas, and content. However, not all content on the Internet can be reached from all access points. For example, a nation may regulate or restrict the content available to Internet users based in the nation. Also, an Internet server may restrict what content is available to an Internet user based on the Internet user's Internet protocol address (IP address). In the event that an Internet user successfully breaches restricted access to various Internet content, some authorities are interested in tracking such users and assessing civil, criminal, or martial penalties on them. There is a problem of unrestricted, untraceable access to all content available on the Internet.

Many have tried to solve this problem. Services such as uProxy are available for Internet users to route their Internet traffic through a trusted source (e.g., computer of friend, relative, etc) that is configured to evade Internet restrictions while preserving IP address anonymity. However, such methods and systems require the user seeking anonymous and unrestricted access to know and trust the source because all traffic routed through the source may be monitored by the source provider. This leaves users vulnerable to the discretion of their source. Further, the speed of access through the source may fluctuate based on the number of users using the source. Such solutions sacrifice speed, anonymity, and may not provide completely unrestricted access.

It is also known to use virtual private networks (VPN) to route encrypted Internet traffic between a user and a server. Such systems and methods allow a user to access content that is not available to the user's computer but is available to the VPN's server computer. Further, such systems hide the IP address of the user's local computer from observers outside of the VPN. It is also known to chain multiple VPN servers together. However, while chaining VPN servers increases security and anonymity, it greatly reduces the download and upload speeds for a user. This is a compounded problem for user computers with low speed Internet access.

Thus, there remains a need for a system and method that provides unrestricted Internet access to users while hiding their local IP address from unwanted observers, all while improving the apparent speed of Internet traffic from the user's perspective.

SUMMARY OF THE INVENTION

The inventive subject matter provides apparatus, systems, and methods for securely providing a content to a user while hiding an identity of the user or the content from an outside observer. In some embodiments, methods include using a third party to deliver to a computing device associated with the user a key specific to a first communication session. It is contemplated that the key can be generated by a triggering event, for example generating new keys as a function of time (e.g., 1/min, 3/hour, 2/hour, 1/hour, variable periodicity, etc), as a function of security risk (e.g., increasing the frequency at which a key is generated or the complexity of the key based on an identifier of the severity/risk of the content), or as a function of a user-selected preference between security and performance (e.g., increased security causes decreased performance/delivery of content, decreased security permits increased performance/delivery of content, etc). Contemplated severity/risk identifiers include, in increasing severity, embarrassing/unsavory content, illegal non-punishable content, punishable, pecuniary content, punishable by incarceration content, and punishable by death content.

A first VPN is established between a server and a computing device associated with the user using the key for the first communication session. A first virtual machine is instantiated at the computing device and a second virtual machine is instantiated at the server. It is contemplated the first or second virtual machines may comprise a virtual desktop, virtual browser, etc. After the first and second virtual machines are instantiated, a second VPN is established between the first and second virtual machines on the computing device and the server, respectively. In some embodiments the second VPN comprises a peer-to-peer connection between the first and second virtual machines. It is also contemplated that the second VPN is established within the first VPN.

Once the second VPN is established, the server transmits the content to the computing device, thus making it available to the user. In some embodiments the first virtual machine launches a virtual browser application at the computing device (e.g., on the first virtual machine). Such a virtual browser application can be used to receive the content. It should be appreciated that such methods hide the identity of the user from outside observers, secures the content that is transmitted, and reduces the volume of transmissions required to present the content to the user.

It should be appreciated that the communication session between the first virtual machine and the second virtual machine (between the computing device and the server) will come to an end (e.g., by user selection, by server selection, by triggering event, etc). In preferred embodiments, at least one of the first or second virtual machines is deconstructed (e.g., deleted, wiped, over-written, etc) upon termination of the communication session. It should be appreciated that deconstructing one of the virtual machines heightens the user's security by removing any sign of the virtual machine, the communication session, or the contents of the communication session from the computing device, the server, or both.

It is contemplated that the server may retrieve a base content from a content source over the Internet, based on a user request. In preferred embodiments the content that is transmitted to the user over the second VPN can include (or consist of) output signals generated from the base content (e.g., something derived from the base content, rather than the base content itself). Such output signals can include a video and an audio signal derived/generated from the base content.

It should be appreciated that a user profile unique to the user can be generated/created based on information retrieved via the first VPN. Such information may include user preferences for the communication session, user location, security risk to the user, level of threat to the user, bandwidth available to the user, etc. In some embodiments, such user profile information is saved as a template on user device 120 or server 130. In preferred embodiments, any record of such information is destroyed before the communication session ends, but it may also be destroyed after the communication ends, by instruction of the user, by instruction at the server, or by the triggering of an event (e.g., lapse of time, security breach, etc).

Systems for securely providing a content to a user while hiding an identity of the user or the content from an outside observer is also contemplated by the inventive subject matter. Such systems include a first virtual machine on a user device, a second virtual machine on a server, a first VPN between the user device and the server, and a second VPN between the first and second virtual machines. The first VPN is established using a key specific to a communication session, which is delivered to the user device (e.g., the key is delivered to the user device by a trusted/secure third party, etc). The second VPN is established using a profile transmitted (e.g., transmitted from the first virtual machine to the second virtual machine, from the user device to the server, vice versa, etc) via the first VPN. The server transmits the content to the user device via the second VPN between the first and second virtual machines.

DETAILED DESCRIPTION

Figure 1:
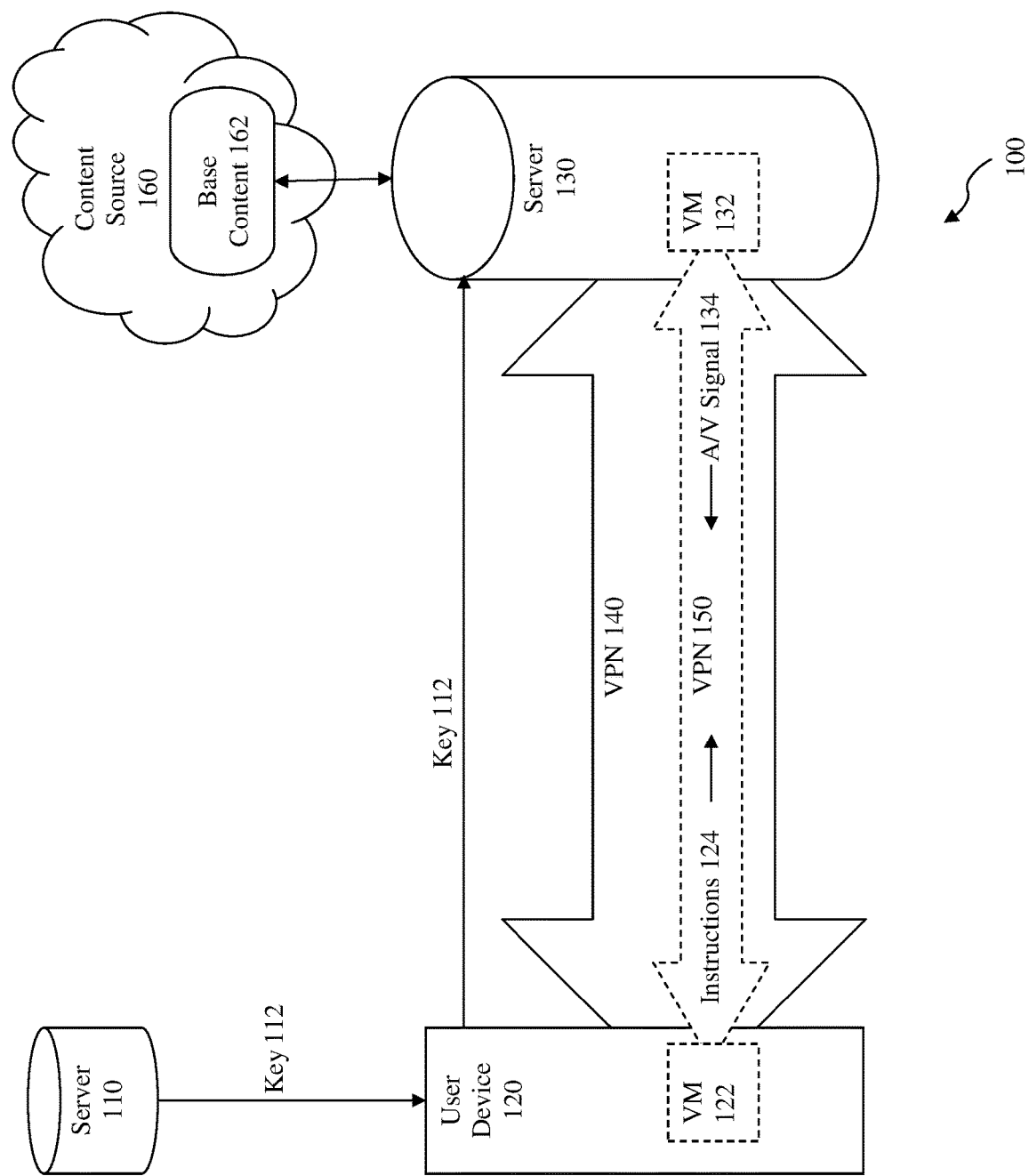
FIG. 1 shows an example architecture for a system for a secure and unrestricted communication session.

The following description includes information that may be useful in understanding the present invention. It is not an admission that any of the information provided herein is prior art, necessary, or relevant to the presently claimed invention, or that any publication specifically or implicitly referenced is prior art.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be noted that any language directed to a computer device or a computer system should be read to include any suitable combination of computing devices, including servers, interfaces, systems, databases, agents, peers, engines, controllers, or other types of computing devices operating individually or collectively in a networked environment (e.g. local intranet or an Internet cloud). One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

One embodiment of the inventive subject matter provides methods for securely providing a content to a user while hiding an identity of the user or the content from an outside observer. It is contemplated to use a third party to deliver to the user a key that is specific to a communication session. The key can be used to establish, with a server, a first virtual private network with a user's computing device for the communication session. A first virtual machine can be instantiated at the user's computing device and a second virtual machine can be instantiated at the server. A second virtual private network can be established, with the server, between the first and second virtual machines for the communication session. Using such a method, it is contemplated that content can be transmitted, by the server, to the user's computing device via the second virtual private network. Viewed from another perspective, such a method prevents observers from outside of the VPN from knowing both the IP address of the user's computing device and the content delivered to the user.

The inventive subject matter also contemplates a system for securely providing content to a user while hiding an identity of the user or the content from an outside observer. The system can include a user device with a first virtual machine and a server with a second virtual machine. A first VPN can transmit information between the user device and the server, and a second VPN can transmit information between the first and second virtual machines. The first VPN is established using a key that is specific to a communication session. Information is transmitted between the user device and the server via the first VPN and used to instantiate the first and second virtual machines, as well as the second VPN. It is contemplated that the content is transmitted to the user device via the second VPN.

FIG. 1 depicts the architecture of a system 100 for secure and unrestricted access to the Internet. System 100 includes server 110, user device 120, and server 130. It is contemplated that server 110 transmits key 112 to user device 120. In some embodiments, server 110 generates key 112 as a key that uniquely identifies a communication session. In other embodiments, server 110 houses a database of unique keys, and selects one to uniquely identify the communication session, and keeps that key locked until the communication session is terminated by system 100. In some embodiments, server 110 is not associated with server 130 (e.g., managed by different organizations, located on different intranet systems, physically located on different server blades, managed by different administrator systems, etc.). In some of these embodiments, the server 130 is further programmed to cause the server 110 to transmit the key 112 to the user device 120, for example by transmitting an instruction to server 110 via a networked connection to transmit key 112 to user device 120. Furthermore, server 130 is also preferably programmed to cause the third party service to generate key 112, for example by transmitting an instruction to a third party service to transmit key 112. Key 112 can be generated using any suitable method. For example, key 112 can be generated using a random number generator as a function of a seed value, such that a different key 112 can be generated based on a different current time seed value, based on an identifier of the user device (e.g. a MAC address, an IP address), based on a public key of user device 120, and/or a unique identifier of a profile of a user of user device 120.

Key 112 is transmitted to server 130 from user device 120 so that server 130 establishes VPN 140 between user device 120 and server 130. Server 130 generally uses key 112 to generate VPN 140. In some embodiments, key 112 is used to access VPN 140 such that only computer devices that transmit an authentication command to server 130 using key 112 can access VPN 140, or computer devices that transmit an authentication command to user device 120 using key 112 can access VPN 140. Once VPN 140 is established, user device 120 and server 130 exchange information via the VPN 140 to instantiate virtual machine (VM) 122 on user device 120 and virtual machine 132 on server 130. Each virtual machine preferably has its own unique identifier, such as a unique IP address, a unique domain name, etc., which allows network traffic addressed to a virtual machine to be routed in a different matter than network addressed to the computer which the virtual machine is instantiated upon. VPN 140 is then used to transfer information between virtual machines 122 and 132 to establish VPN 150 between the two virtual machines. In the present embodiment, VPN 150 is shown as a VPN within VPN 140, but in some embodiments VPN 150 could be separate and distinct from VPN 140 without any association.

Once VPN 150 is established, user device 120 could then send instructions 124, by way of virtual machine 122, through VPN 150 to server 130, by way of virtual machine 132. The instructions 124 of some embodiments include a request to retrieve content from a content source 160 (e.g., a website, etc.) The server then executes instructions 124 on behalf of VM 122. Content source could respond in any suitable manner, for example by transmitting base content 162 from the content source 160 to server 130. In some embodiments, server 130 simply acts as a conduit to feed data to VM 122 via VM 132. In other embodiments, server 130 processes base content 162 to generate audio/visual signal (A/V signal) 134. Server 130 then sends A/V signal 134, by way of virtual machine 132, through VPN 150 to user device 120, by way of virtual machine 122. User device 120 then processes A/V signal 134 to present content of the A/V signal to the user, for example via a display monitor and/or speakers (both not shown) of user device 120.

In preferred embodiments key 112 is transmitted to user device 120 upon a request transmitted from user device 120, but it should be appreciated that the transmission of key 112 can be initiated upon request from a third party system (not shown), upon request from server 130, or upon the triggering of an event (e.g., time lapse, initiate application command, initiate Internet connection command, data breach, security breach, external event, etc). In some embodiments, key 112 is provided by a third party application such as Cyber Dust or Telegram Messenger. Viewed from another perspective, it is preferred that keys sent to user device 120 are unique, encrypted and destroyed after being used to initiate or maintain VPN 140 to secure VPN 140 and ensure no unauthorized access.

User device 120, server 110, and server 130 can be any appropriate computing device, such as a smart phone, tablet, laptop, desktop computer, computer terminal, cloud computing system, or even a SaaS system. While server 130 is shown as a single system with a direct connection to content source 160, server 130 could comprise a chain of VPNs or a chain of computer systems and/or networks in some embodiments.

As depicted, key 112 is used to initiate VPN 140 between user device 120 and server 130. It should be appreciated that multiple keys can also be generated or provided to user device 120 after VPN 140 has been established to maintain VPN 140, or to change the configuration of VPN 140 (e.g. alter a security protocol used by VPN 140). In some embodiments, a key is generated by server 110 and sent to user device 120 at least every 1, 2, 3, 4, 5, 6, 7, 8, 9, 10, 15, 30, 45, 60, 90, 120, 180, 300, 600, or 1800 seconds. Each new key can be used to reconfigure VPN 140, or to initiate a new VPN 140 to improve security. In some embodiments, a key mismatch or failure to receive a key by either user device 120 or server 130 results in destruction of all virtual machines and termination of all VPN connections or a warning message to be transmitted to either user device 120 or server 130. In some embodiments, the same key or a different key could be used to generate VPN 150.

By utilizing a unique key only accessible to user device 120 and server 130 VPN 140 enables a secure, encrypted, peer-to-peer connection between server 130 and user device 120. Viewed from another perspective, VPN 140 is configured to prevent observers from outside the network from decrypting the information exchanged between server 130 and user device 120. Both VPN 140 and VPN 150 can use any suitable VPN protocol, including at least point-to-point tunneling protocol (PPTP), layer two tunneling protocol (L2TP), Internet protocol security (IPsec), Transport Layer Security (SSL/TLS), Datagram Transport Layer Security (DTLS), Microsoft Point-to-Point Encryption (MPPE), Microsoft Secure Socket Tunnelling Protocol (SSTP), Multi Path Virtual Private Network (MPVPN), or Secure Shell (SSH). VPN 140 and VPN 150 can use the same protocol, but may also use different protocols, or a combination of protocols, depending upon its configuration. In some embodiments, the protocol used by VPN 140 or VPN 150 could be altered periodically. In preferred embodiments, VPN 140 is used to exchange information between server 130 and user device 120 in order to build a profile for the communication session, to instantiate VM 122 and VM 132, to establish a protocol for VPN 150, or to establish VPN 150 between VM 122 and VM 132.

It is contemplated that VPN 150 is used to exchange information between VM 122 and VM 132. As depicted, VPN 150 is nested within VPN 140. However, it should be appreciated that VPN 140 and VPN 150 could have alternative configurations (e.g., in parallel, in series, chained, etc). It should be appreciated that using a system such as system 100 provides greatly improved security for the communication between VM 122 and VM 132 via VPN 150. In preferred embodiments, the primary role of VPN 150 is to deliver content to user device 120. VM 122 issues instructions 124 to VM 132. Instructions 124 typically take the form of keystroke, mouse click, mouse movement, finger/stylus press, or other interface manipulation gestures. For example, instructions 124 may comprise mouse clicks directed to download a file, stream a video, or access a web page. Instructions 124 may also take the form of voice commands or software commands.

VM 132 receives instructions 124 via VPN 150, which VM 132 then executes. In some embodiments the relationship between VM 132 and VM 122 is similar to a remote desktop connection, or Go To My PC™. Viewed from another perspective, instructions 124 from VM 122 are executed on VM 132 in order to perform operations, such as access a webpage, download a file, or stream a video. As depicted, instructions 124 instruct VM 132 to retrieve base content 162 from content source 160. Once content 162 has been obtained by VM 132, VM 132 performs operations on content 162 to render audio and/or video (A/V) signals 134. A/V signals 134 are then transmitted to VM 122 via VPN 150. It should be appreciated that A/V signals 134 permit VM 122 to display a representation of base content 162, without actually transmitting base content 162 to VM 122 or user device 120. In some embodiments, the server 130 is also programmed to compressed and/or encrypt the A/V signals 134 before transmitting to VM 122.

Viewed from another perspective, VM 132 only sends data to VM 122 required to provide a representation of base content 162, which may require less bandwidth than providing the entirety of base content 162. Further, because VM 132 performs the required operations to display base content 162, VM 122 does not bear the hardware burden of performing those operations. Viewed from another perspective, a high processor burden to render base content 162 is only suffered by VM 132 or server 130, while a lesser processor burden of rendering A/V signal 134 is performed by VM 122. Furthermore, it should be appreciated that the bandwidth required to retrieve the content 162 may be substantially larger than the bandwidth required to transmit the AV signal 134, especially in view of today's high resolution video and audio technologies. In some embodiments, the VM 132 is programmed to turn the content 162 into lower resolution video and audio signals before transmitting to the VM 122. It should be appreciated that the strength, speed, and bandwidth of the network connection between VM 122 and VM 132 can be much less than the connection between VM 132 (or server 130) and content source 160, with little or no deterioration in quality of the display of base content 162 on VM 122.

It should be appreciated that content source 160 can be a server located in a restricted country (e.g., US server holding content, with user desiring content located in Iran) or a server containing content with restricted access for a particular region (e.g., Netflix™ server with content licensed to US, with user trying to access content from outside US). It is contemplated that if server 130 is not permitted access to content source 160, or base content 162, server 130, or VM 132, may establish an additional VPN network with a server that does have access to content source 160 or base content 162. In some embodiments, if instructions 124 direct VM 132 to access a content source 160 or base content 162 that server 130 or VM 132 does not have access to, then VM 132 directs VM 122, and user device 120, to terminate all VPN connections and virtual machines, and reinitiate VPN connections with a server that does have access to the content source 160 or base content 162.

In some embodiments, the software infrastructure of system 100 (e.g. key 112, VPN 140, VPN 150, VM 112, and/or VM 132) is instantiated at the start of a communication session, and terminates at the end of the communication session. The instantiation and termination of the communication session are preferably controlled by instructions transmitted from user device 120, but could be transmitted from a $3^{rd}$ party system or by server 130 in other embodiments. In preferred embodiments, once the communication session ends, VM 122 and VM 132 are completely deconstructed (e.g. deleted by each of the computer systems of system 100 or overwritten by each of the computer systems of system 100). Preferably, once the communication session ends, no record of the contents of the session, the identity of the content, the source of the content, or the identify the user is retained by either user device 120 or server 130. It should be appreciated that systems such as system 100 greatly improve the ability of the user, as well as the server administrator, to obscure the existence of a communication session between user device 120 and server 130. Indeed, such a system allows all indications or remnants of content or communication sessions between user device 120 and server 130 to be completely eliminated by deconstructing VM 422 and VM 432 without impairing the use or functionality of the host devices. Viewed from another perspective, inspection of user device 120 or server 130 would yield no evidence of any relationship between the two devices, or of content transmitted between them, once the respective virtual machines are deconstructed.

It should further be appreciated that the virtual machines on user device 120 or server 130 can be terminated and deconstructed by various triggers, including manual triggers (e.g., command of user, command of server administrator, etc) and automatic triggers (e.g., the user device or server Internet traffic is being monitored, either device is being monitored, either device is subject to a physical or electronic hacking attempt, the security of either device has been compromised, the VPN has a defect, etc). For example, if the server or the user device is seized after a communication session has ended, the virtual machines on both devices will already have been deconstructed and no evidence of the communication session will remain. However, if the server or the user device is seized during a communication session, the user or server administrator could terminate the session or send another signal to deconstruct the virtual machines.

Figure 2:
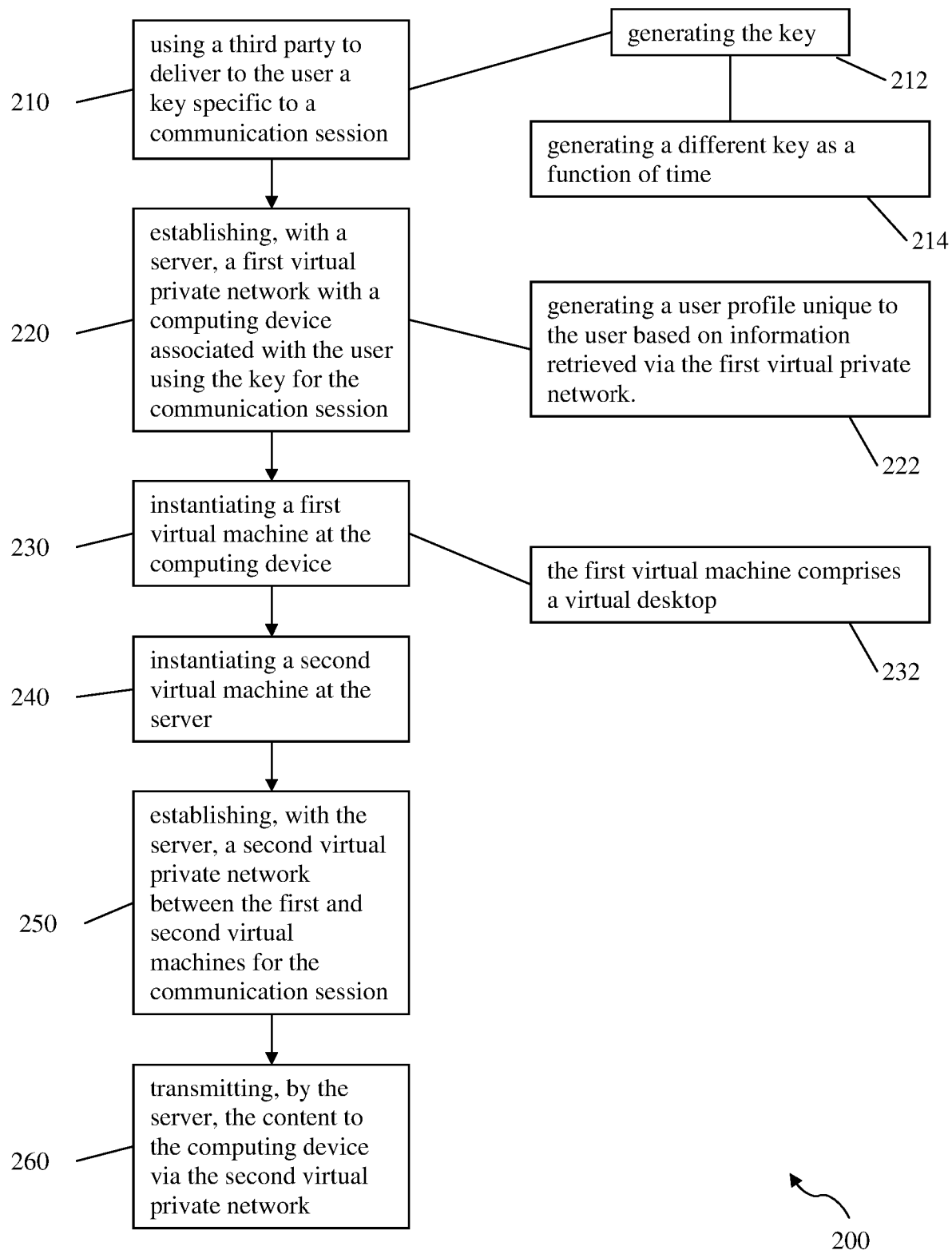
FIG. 2 shows a flow chart for establishing a secure and unrestricted communication session.

FIG. 2 depicts flow chart 200, which displays the steps of a method for secure and unrestricted access to Internet content. In some embodiments, steps 210, 220, 230, 240, 250, and 260 are essential steps of the inventive subject matter. However, it should be appreciated that one or more of the steps can be removed, modified, or repeated within the scope of the inventive subject matter. In some embodiments, the order of the steps proceeds, stepwise, from 210 consecutively to 260. The steps can also be performed out of order.

In some embodiments step 210 can further comprise steps 212 and 214. In some embodiments, step 212 is performed after step 214, and either concurrently before, or after step 220. In addition, step 220 can further comprise optional step 222. In similar fashion, step 230 can further comprise optional step 232.

Figure 3:
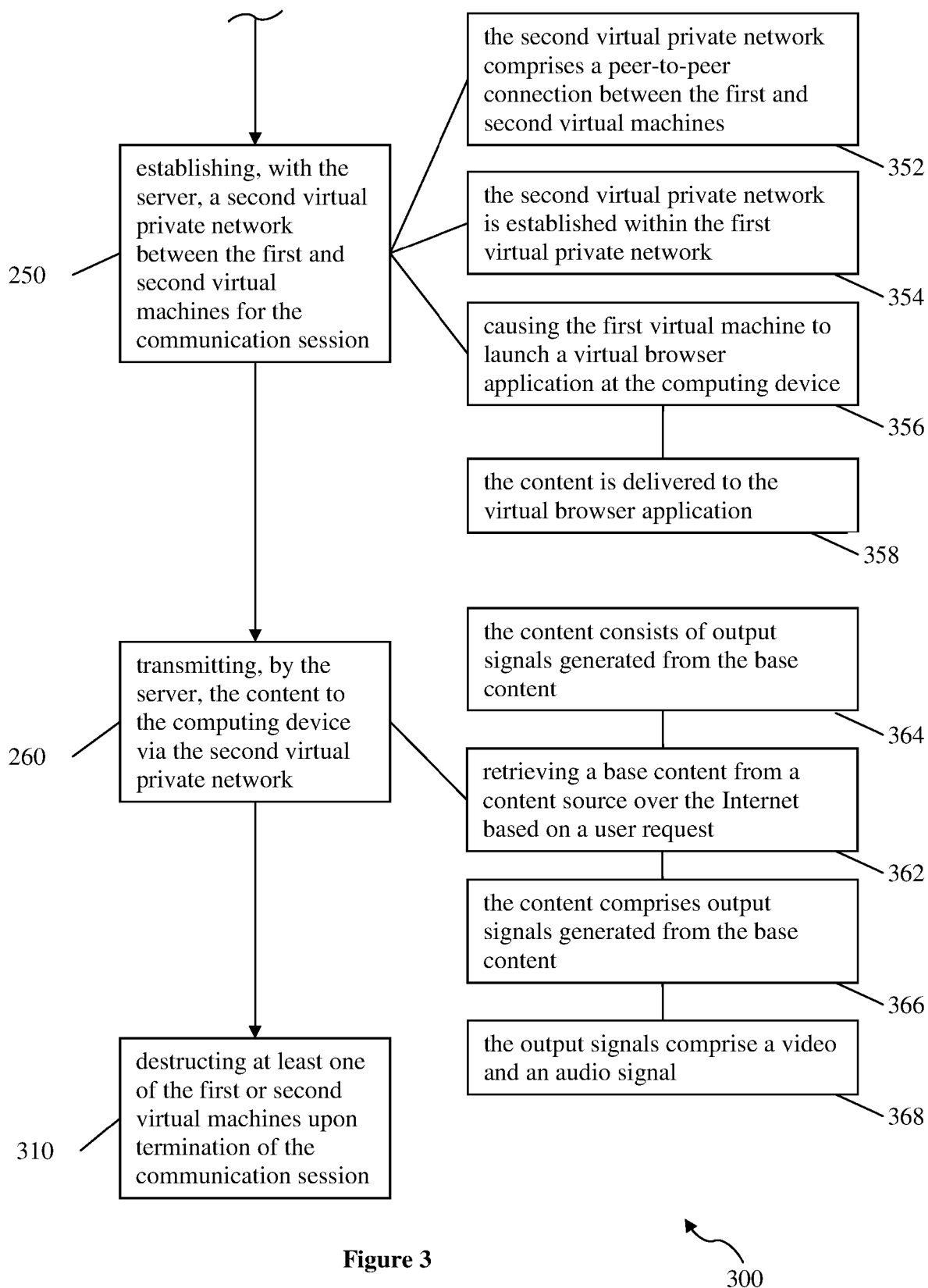
FIG. 3 shows a flow chart with additional steps for establishing a secure and unrestricted communication session.

FIG. 3 depicts flow chart 300, which shows steps 250 and 260 of flow chart 200. In some embodiments, steps 310, 250, and 260 are essential steps of the inventive subject matter. However, it should be appreciated that one or more of the steps can be removed, modified, or repeated within the scope of the inventive subject matter.

Step 250 can further comprise optional steps 352, 354, 356, and 358. In some embodiments, step 358 occurs after step 356, but before, concurrent, or after step 260. It should be appreciated that one or a combination of steps 352, 354, 356, and 358 can be performed.

Step 260 can further comprise optional steps 362, 364, 366, and 368. In some embodiments, steps 364, 366, or 368 occur after step 362. It should also be appreciated that step 368 can occur after 366. In some embodiments, one of steps 352, 354, 356, or 358 are performed, but it is contemplated that any combination of the steps may also be performed.

Figure 4:
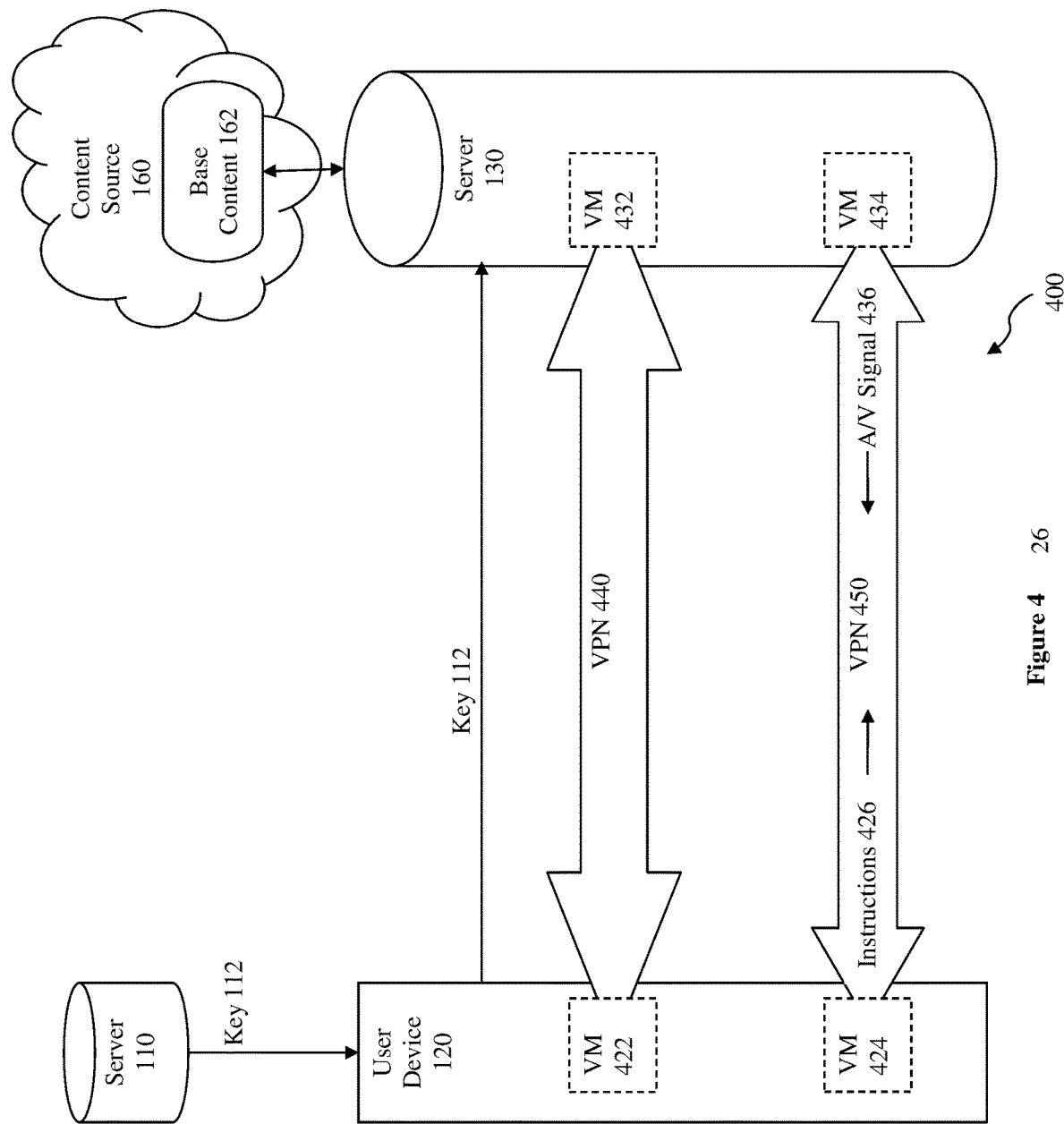
FIG. 4 shows another example architecture for a system for a secure and unrestricted communication session.

FIG. 4 depicts the architecture of a system 400 for secure and unrestricted access to the Internet. Components of system 400 with the same numbering as FIG. 1 are as described above regarding FIG. 1. Virtual machine 422 and virtual machine 424 are collocated on user device 120. It is contemplated that the virtual machines may be collocated under the same virtual machine manager (a/k/a hypervisor) or each may be located under different virtual machine managers. Similarly, virtual machine 432 and virtual machine 434 are collocated on server 130.

Key 112 is used in system 400 to establish VPN 440 between VM 422 hosted by user device 120 and VM 432 hosted by server 130. VM 422 and VM 432 communicate via VPN 440 to create a profile for the communication session, to instantiate VM 424 and VM 434, to establish a protocol for VPN 450, or to otherwise establish VPN 450 between VM 424 and VM 434. Preferably, VM 422 and VM 432 are terminated and deconstructed once VPN 450 has been established between VM 424 and VM 434. Thus it should be apparent that coordinating the establishment of the encrypted and secure VPN 450 via the encrypted and secure VPN 440 further enhances and improves the security of communication between the user at VM 424 and the server at VM 434.

Once VPN 450 has been established, the user then inputs instructions 426 at VM 424, which are then communicated to the server at VM 434. Such instructions can be as described above with respect to FIG. 1. It is contemplated that such instructions include instructions for the server to retrieve base content 162 from content source 160 from the Internet. Once retrieved, server 130 reduces base content 162 to A/V signal 436, as described with respect to FIG. 1. Viewed from another perspective, if the transmission of base content 162 from content source 160 to VM 434 requires a data stream of X bits per second, the data stream is reduced to A/V signal 436 at Y bits per second, such that Y is less than (in some cases substantially less than) X (e.g., Y<X, Y<X/2, Y<X/3, Y<X/4, Y<X/5, Y<X/6, Y<X/7, Y<X/8, Y<X/9, Y<X/10, Y<X/11, Y<X/12, Y<X/13, Y<X/14, Y<X/15, Y<X/20, etc). Such reduction of the data stream required for base content 162 to the data stream for A/V Signal 436 can be accomplished in part by down-sampling, scaling, compressing, processing, simplifying, or otherwise reducing the data stream. VM 434 then communicates A/V signal 436 to VM 424 via VPN 450.

In some instances, it is preferred that VPN 450 be further used to create a profile for further communication sessions, to instantiate additional virtual machines hosted on user device 120 and server 130, to establish a protocol for an additional VPN, or to otherwise establish an additional VPN between a virtual machine hosted on user device 120 and a virtual machine hosted on server 130 (or other server or device). Thus, it should be appreciated that a subsequent generation of virtual machines and VPNs connecting the machines can be intermittently created using the previous generation of virtual machines and VPN. After establishing the subsequent generation of virtual machines and VPN connecting the machines, the previous generation is preferably terminated and deconstructed. Thus, such a system of revolving virtual machines and VPNs provides enhanced security and unrestricted access to the Internet.

Figure 5:
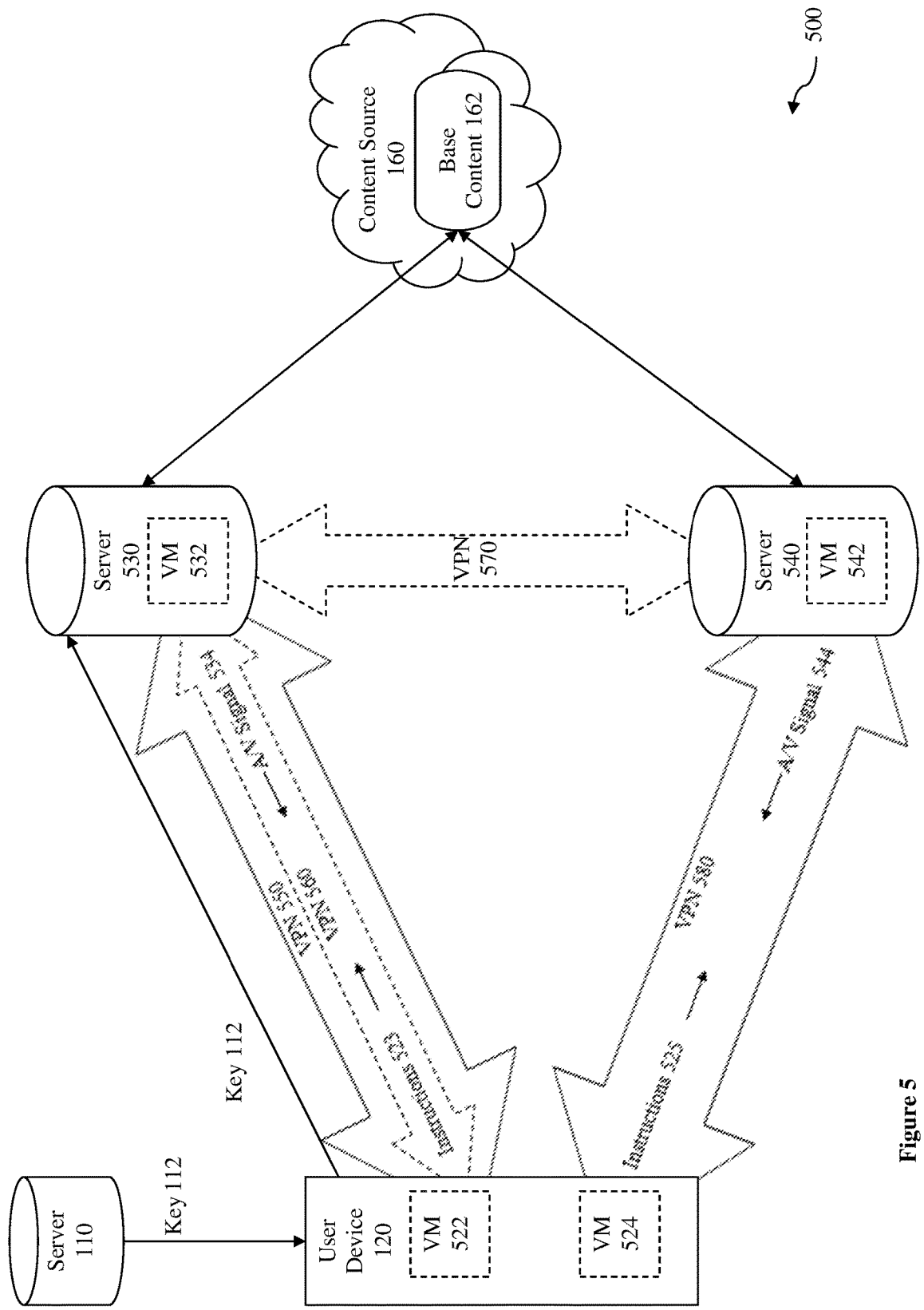
FIG. 5 shows yet another example architecture for a system for a secure and unrestricted communication session.

FIG. 5 depicts the architecture of a system 500 for secure and unrestricted access to the Internet. Components of system 400 with the same numbering as FIG. 1 are as described above regarding FIG. 1.

Key 112 is received by user device 120 and transmitted to server 530 to establish VPN 550 between user device 120 and server 530. Once VPN 550 is established, user device 120 and server 530 exchange information via VPN 550 to instantiate virtual machine (VM) 522 on user device 120 and virtual machine 532 on server 530. Once established, VPN 550 is used to securely transfer encrypted information between virtual machines 522 and 532. It is contemplated such secure and encrypted information includes coordinating to establish VPN 560 between the two virtual machines. User device 120 then sends instructions 523, by way of virtual machine 522, through VPN 560 to server 530, by way of virtual machine 532. In some embodiments, instructions 523 include a request to retrieve content from content source 160 (e.g., a website, database, etc). Server 530 then executes instructions 523 and retrieves, for example, base content 162 from the content source 160. Server 530 then processes base content 162 to generate audio/visual signal (A/V signal) 534. Server 530 then transmits A/V signal 534, by way of virtual machine 532, through VPN 560 to user device 120, by way of virtual machine 522. User device 120 then processes A/V signal 134 to display the content to the user. It should be appreciated that the data or data stream comprising base content 162 is greater (in some cases substantially greater) than the data or data stream comprising A/V signal 534.

As depicted, VM 532 is further communicatively coupled to server 540 via VM 542, by way of VPN 570. In some embodiments, VPN 570 pre-dates the establishment of VPN 550 or VPN 560, but it is also contemplated that VPN 570 be established upon an instruction or an event. For example, VPN 570 can be established upon instruction from the user, via user device 120 and VM 522 by way of VPN 560, or instruction from an administrator of server 530. However, VPN 570 can also be established upon the occurrence of an event (e.g., time lapse, compromised security, hacking attempt of server 530, VM 532, VM 522, or device 120, etc), as a result of a user or system preference setting (e.g., high security, low security, high risk of danger, low risk of danger, high sensitivity of data, low sensitivity of data, etc), or based on hardware demands/limitations at server 530 (e.g., too many virtual machines at server 530, too high of traffic at server 530, over-clocking server 530, heat limitations, power limitations, hardware repair, etc).

Using VPN 570, server 540 coordinates with user device 120 (e.g., via VPN 570, VM 532, VPN 560, and VPN 522) to instantiated VM 524 on user device 120 and VM 542 on server 540. Once VM 524 and VM 542 are instantiated, the secure and encrypted data route between server 540 and user device 120 (e.g., via VPN 570 and VPN 560) is used to coordinate the establishment of VPN 580 between VM 524 and VM 542. Virtual machine 522 and virtual machine 524 are collocated on user device 120. It is contemplated that the virtual machines may be collocated under the same virtual machine manager (a/k/a hypervisor) or each may be located under different virtual machine managers.

Once the secure and encrypted VPN 580 is established, VPNs 550, 560, and 570 are preferably terminated, all (or substantially all) communication between user device 120 and server 530 (e.g., via VM 522 and VM 532 by way of VPN 560) is terminated, all (or substantially all) communication between server 530 and server 540 (e.g., via VPN 570) is terminated, and VM 522 and VM 532 are deconstructed. Viewed from another perspective, there is no remaining record of communication between user device 120 and server 530, or between server 530 and server 540.

The user continues to have unrestricted, anonymous, and secure access to content source 160 (e.g., Internet, database, etc.) via VPN 580 between VM 524 and VM 542 in the manner previously described. It should be appreciated that systems and methods as described in FIG. 5 can be used to repeatedly cycle new VPN connections between successive generations of virtual machines on different servers, as security concerns or hardware utilization/limitations may require.

It should be appreciated that additional modifications of the described systems and methods are contemplated by the inventive subject matter, including various configurations of virtual machines. For example, it is contemplated when $VM_1$ on a user device communicates with $VM_2$ on a server (via VPN), $VM_3$ can be instantiated on the server to directly access a content (e.g., on the Internet) and process it. The output generated from the content (e.g., A/V signal) is then transmitted to $VM_2$ and subsequently transmitted to $VM_1$ on the user device. Thus, it should be apparent such configuration further shields and anonymizes $VM_2$, $VM_1$, the user device, and the user. Indeed, further shielding and anonymizing of the user may be accomplished by instantiating numerous collocated virtual machines (or collocated hypervisors having one or more virtual machines). Communications can then be channeled among the collocated virtual machines (or collocated hypervisors having virtual machines) to further obfuscate the identity of the user. Such configurations include the use of gateway virtual machines (or gateway virtual machine managers/hypervisors) that are used to send and receive content over a VPN between a user device and a server in conjunction with workstation virtual machines (or workstation virtual machine managers/hypervisors) that are used to process or display the content.

It should be appreciated that the methods and systems of the inventive subject matter provide new security and anonymous functionality to communication between user devices and servers that did not previously exist.

Various objects, features, aspects and advantages of the inventive subject matter will become more apparent from the following detailed description of preferred embodiments, along with the accompanying drawing figures in which like numerals represent like components.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of securely providing a content to a user device, the method comprising:
   using a third party to deliver to the user device a key specific to a first communication session, wherein the key is generated by a third-party computer system distinct from the user device and the server;
   establishing, with a server, a first virtual private network with the user device associated with the user using the key for the first communication session;
   instantiating a first virtual machine at the user device;
   instantiating a second virtual machine at the server;
   establishing, with the server, a second virtual private network between the first and second virtual machines; and
   transmitting, by the server, the content to the user device via the second virtual private network;
   wherein the second virtual private network is a inter-device network; and
   wherein the server and the user device are separate devices.

2. The method of claim 1, wherein the second virtual private network comprises a peer-to-peer connection between the first and second virtual machines.

3. The method of claim 1, wherein the second virtual private network is established via the first virtual private network.

4. The method of claim 1, further comprising generating the key.

5. The method of claim 4, wherein generating the key comprises generating a different key as a function of time.

6. The method of claim 1, further comprising destructing at least one of the first or second virtual machines upon termination of the first communication session.

7. The method of claim 1, further comprising retrieving a base content from a content source over the Internet based on a user request.

8. The method of claim 7, wherein the content comprises output signals generated from the base content.

9. The method of claim 8, wherein the output signals comprise a video and an audio signal.

10. The method of claim 7, wherein the content consists of output signals generated from the base content.

11. The method of claim 1, further comprising causing the first virtual machine to launch a virtual browser application at the user device.

12. The method of claim 11, the content is delivered to the virtual browser application.

13. The method of claim 1, wherein the first virtual machine comprises a virtual desktop.

14. The method of claim 1, further comprising generating a user profile unique to the user based on information retrieved via the first virtual private network.

15. A system for securely providing a content to a user device comprising:
a user device having a first virtual machine;
a server having a second virtual machine;
a first virtual private network between the user device and the server; and
a second virtual private network between the first and second virtual machines;
wherein the first virtual private network is established using a key specific to a communication session delivered to the user device;
wherein the key is generated by a third-party computer system distinct from the user device and the server:
wherein the second virtual private network is established using a profile transmitted via the first virtual private network; and
wherein the server transmits the content to the user device via the second virtual private network;
wherein the server and the user device are separate devices; and
wherein the server and the user device are separate devices.

16. The system of claim 15, wherein the profile is transmitted to the server from the user device.

17. The system of claim 15, wherein the first and second virtual machines have distinct network identifiers from both the user device and the server.

18. The system of claim 15, wherein the key is generated by a third-party computer system distinct from the user device and the server.

19. The system of claim 18, wherein the key is transmitted from the third-party computer system to the user device.

20. The system of claim 18, wherein the key is transmitted from the third-party computer system to the server.

* * * * *